Sept. 10, 1968  F. E. GUTH  3,401,258
LUMINAIRE REFLECTOR
Filed Oct. 17, 1966  2 Sheets-Sheet 1
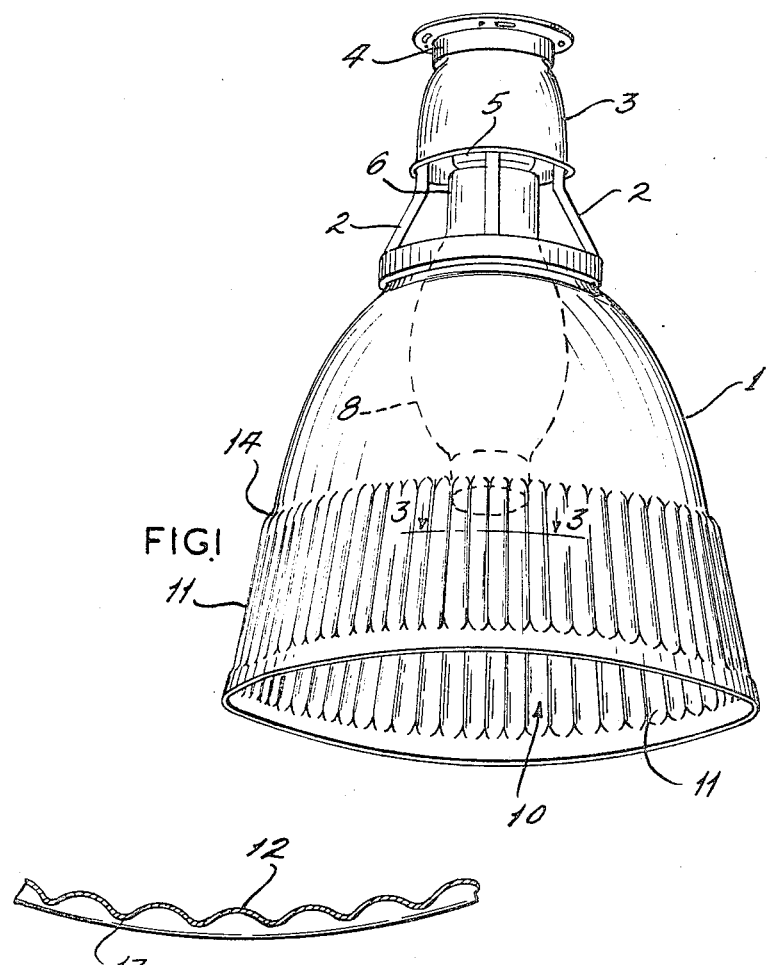
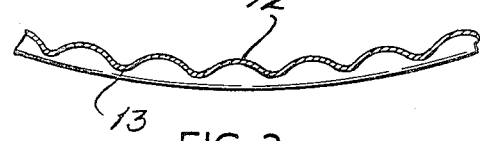
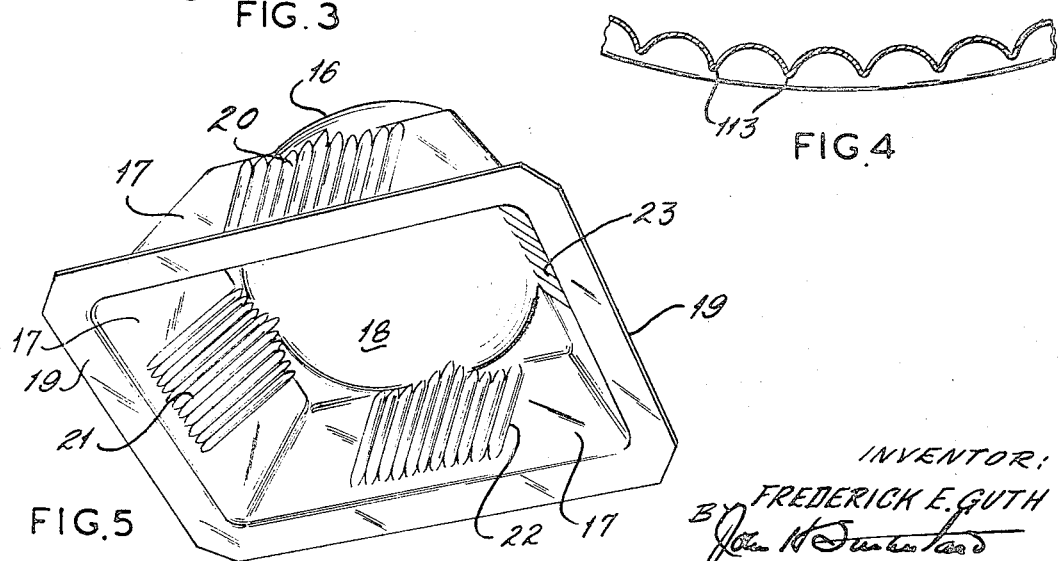
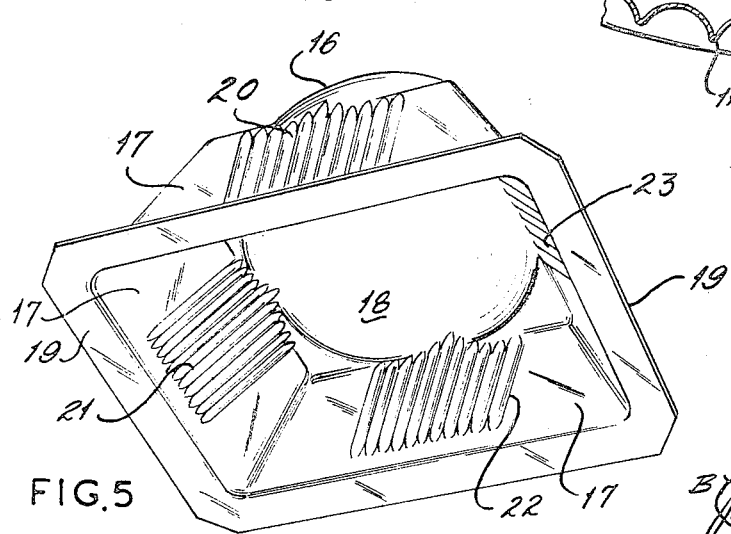
INVENTOR:
FREDERICK E. GUTH
BY
ATTORNEY.

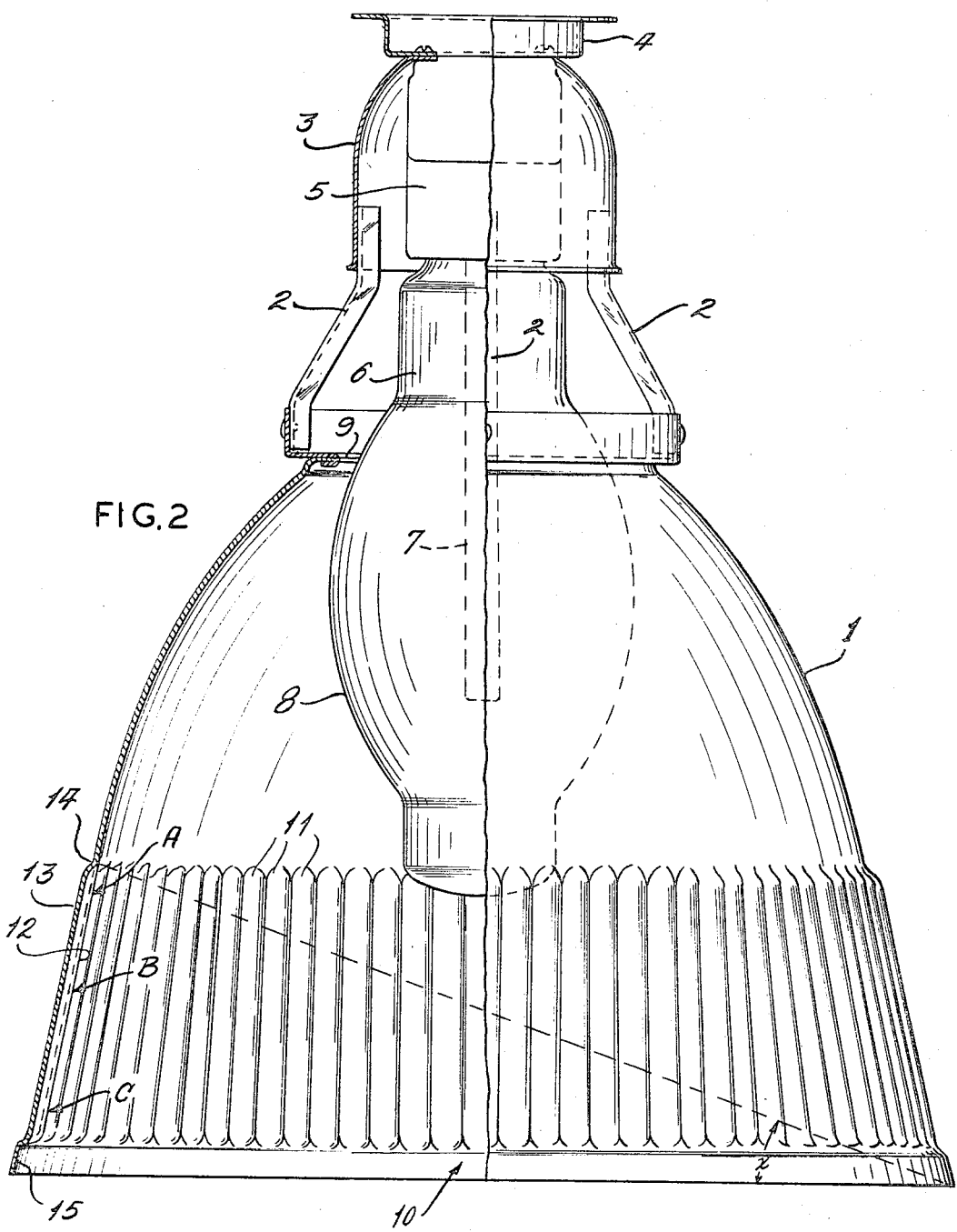

United States Patent Office 3,401,258
Patented Sept. 10, 1968

3,401,258
LUMINAIRE REFLECTOR
Frederick E. Guth, Clayton, Mo., assignor to The Edwin F. Guth Company, St. Louis, Mo., a corporation of Missouri
Filed Oct. 17, 1966, Ser. No. 587,090
8 Claims. (Cl. 240—103)

ABSTRACT OF THE DISCLOSURE

Downlight luminaire and process for controlling objectionable glare therefrom which involves providing a succession of rounded ridges on the inside of a coniform reflector at regions thereon which otherwise would be objectionably glaring when viewed from angles of twenty or more degrees below horizontal with the aperture of the reflector.

---

The invention relates to illumination, and particularly to the control of glare sensible by an eye viewing a reflector from normal viewing angles.

Modern illumination devices, such as mercury vapor lamps, are characterized by such a high order of light output that it is almost imperative that the light source be shielded to prevent ocular discomfort to persons who, in the normal course of their affairs, are likely to find their line of sight unavoidably, but not deliberately, addressed toward the light source. Consequently, dome-shaped reflectors have been provided to intercept light emerging horizontally, or nearly so, from the source, and to divert such light in a generally downward direction. However, ordinary reflectors, when used with such high intensity sources of light, introduce the unpleasantness that the inside of the reflector adjacent the mouth thereof becomes a source of objectionable glare when viewed from normal viewing angles; and the more specular the reflector, the more aggravating the objection becomes.

It is therefore the object of the invention to minimize such objectionable glare without diminishing the functional efficiency of the reflector in concentrating the output light where it is most needed.

Such object is achieved in accordance with the present invention by treating the portion of the reflector from which emanates the aforesaid objectionable glare in a manner which so diverts, but preferably does not substantially diffuse, the incident light that there is no substantial contiguous area of glare in any line of sight within normal viewing angles. This may be readily accomplished by providing, at those interior portions of a reflector from which the glare would otherwise emanate, a series of substantially specular flutes whose individual length-dimension is substantially parallel with the general direction in which wanted light travels from the source (or a reflector surrounding the source) toward the area to be illuminated, that is to say, that where a given work area is illuminated with "downlight" from an overhead source within a reflector which confines the spread of the light to a more or less conical field (whose apex is at the source, and whose base is at the work area), the individual flutes extend lengthwise in substantially parallel relationship with the correspondingly oriented elements of the cone of light, i.e., within zero to about fifty degrees of vertical.

The series of flutes is preferably integral with the reflector, but may be a separate piece of corrugated metal (or other material having substantial specularity) positioned to mask the portions of the reflector from which objectionable glare would otherwise emanate. With a metal reflector which is intended for use in open-aperture familiar type of dome-shaped rounded-aperture sheet condition, the fluting is preferably provided by corrugating the perimetric belt adjacent the aperture of the reflector which is visible at lines of sight between sixty and ninety degrees from nadir. In a reflector which has a lens across its aperture, the fluting can be confined to those areas which reflect source light at such an angle that, when refracted by the lens, it produces objectionable glare at viewing angles of sixty to eighty degrees from nadir.

Irrespective of whether the reflector is to be used with or without a lens, where the reflector is intended to be used with its aperture in a substantially horizontal plane, the longitudinal center lines of the individual flutes lie respectively in planes which are substantially vertical. The fluting may be serpentine or saw-toothed, but in either case, it is preferred that there be a minimum of contiguous area in the fluted belt which occupies the same position, relative to source of light, that it would have occupied had it not been so fluted. The optimum configuration of the fluting is that there be a minimum of flatness in contiguous surface areas. To achieve the ultimate in the elimination of such flatness would require that the ridges and valleys have zero radius of bending, but such is not possible in practical operations where metal is bent. Hence, from the practical standpoint, such is approximated by curving the metal on the shortest feasible radius, or by bending it as sharply as feasible. However, the closer the bends or ridges or valleys are to each other, the more the brightness of their individual increments of surface will tend to interblend, and minimize the reduction glare. Hence, a compromise must be made, and for practical purposes, the preferred ridge-to-ridge or valley-to-valley spacing of the flutes may be from about ⅜ to ⅝ inch on the average, it being realized that when the reflector is a coniform, the spacing increases toward the aperture of the reflector.

It is important that at least the fluted surface of the reflector be substantially specular, and the specularity is preferably as high as possible or practical. Where, as preferred, the reflector is made of sheet aluminum, the specularity may be controlled by the grade of aluminum employed and by treatment given it. For example, the ultimate in reduction of glare from the fluted area may be achieved by utilizing polish grade aluminum (commercially termed "Alcoa No. 12") sheets (99+% pure) which, after formation, are polished to the highest practical degree, and finally treated in accordance with the conventional "Alzak" treatment. For practical purposes, however, etch grade aluminum (commercially termed "Alcoa No. 31") is eminently satisfactory when, after formation, the fluted reflector is etched in the conventional way and then subjected to the "Alzak" process. The "Alzak" process involves two principal operations, to wit:

First, electrolytic brightening;
Second, anodic coating.

The conventional etching involves dipping in caustic soda solution (for a selected time period) followed by cleaning with nitric acid solution. Surprisingly, the degree of glare reduction achieved by the present invention increases as the specularity of the fluted area increases; and with "Alzak" treated reflectors, the degree of both specularity and glare reduction decreases as the duration of the etching operation increases. This is illustrated by the following test data on a reflector on which an area (which normally emitted objectionable glare) was successively masked with differently treated, but structurally identical inserts fluted in accordance with the present invention:

TABLE I

| Insert | Material | Treatment | Glare (foot-lamberts) |
| --- | --- | --- | --- |
| 1 | No. 12 Aluminum | Polished, 15 minute E.B., 8 minute A.C. | 680 |
| 2 | No. 31 Aluminum | 1 min. Etch, 15 min. E.B., 8 min. A.C. | 800 |
| 3 | do | 3 min. Etch, 15 min. E.B. 8 min. A.C. | 900 |
| 4 | do | 5 min. Etch, 15 min. E.B., 8 min. A.C. | 1,000 |
| 5 | do | 5 min. Etch, 15 min. E.B., 8 min. A.C. Brushed with wire brush and sand. | 1,900 |
| 6 | do | Painted Baked-on Gloss White Enamel. | 4,400 |

In the foregoing table: "E.B." means electrolytic brightening; "A.C." means anodic coating. In each test, the illumination was by the same 400 watt clear mercury vapor lamp at 120 volts. The foot-lambert readings were each taken with the same "Spectra" brightness meter aimed at 15° with the horizontal and from the same distance, reading the brightness of a ¾ inch diameter circular area located at the same position on the respective fluted inserts.

Two styles of coniform reflectors embodying the invention are shown in the accompanying drawings, in which:

FIGURE 1 is a perspective view of a luminaire including a dome-shaped reflector having a circular aperture and fluted in accordance with the present invention;

FIGURE 2 is a view primarily in side elevation, but partly in section, of a luminaire embodying the reflector shown in FIGURE 1;

FIGURE 3 is a sectional view taken along line 3—3 of FIGURE 1 on enlarged scale;

FIGURE 4 is a sectional view corresponding to FIGURE 3, but showing a modified form of fluting; and FIGURE 5 is a perspective view of another style of dome-shaped reflector having a polygonal aperture and embodying the fluting of the present invention.

In the embodiment shown in FIGURES 1, 2 and 3, the luminaire includes a dome-shaped reflector 1 connected by a plurality of spaced struts 2 to a shield 3, having a flange 4 for ready mechanical and electrical connection with a conventional fitting which mechanically supports the other parts and supplies electrical power to a socket 5 within shield 3, and therethrough to a light source 6. In the form shown, the light source is a conventional 400 watt mercury vapor lamp having a mercury-containing capsule 7 enclosed within a glass envelope 8. In the form shown, the reflector 1 is a quasi-parabolic conoid truncated at its zenith to provide an opening 9 of size sufficient to accommodate the passage of that section of the light source 6 which must be passed through it. The geometric configuration of the reflector 1 departs from true parabolic by modification such as to approach, in a practical way and with an elongated source of light, the theoretical effect of a point source of light at the focus of a truly parabolic reflector. It will be understood, however, that the configuration of the reflector may be quasi-elliptic, or any other conic, or substantially conic, section desired, rather than parabolic as shown. The reflector 1 has a planar aperture 10 which, in this embodiment, is circular, and constitutes the base of the dome-shaped reflector.

In accordance with the present invention, the reflector 1 is provided with a circumferentially extending belt of successive elongated flutes 11, which, at any chosen section, have their ridges 12 and their valleys 13, respectively, equi-sized and equi-spaced with the ridges merging curvilinearly into the valleys. As clearly shown in FIGURE 3, the radius of curvature of the ridges 12 is substantially greater than that of the valleys 13. The belt of fluting is circumferentially contiguous about the zone of the reflector adjacent aperture 10, and the individual flutes extend lengthwise from adjacent aperture 10 toward the light source 6 for a distance which embraces that zone of the interior of reflector 1, from which, at normal viewing angles, objectionable glare emanates. In the embodiment shown, the upper extremities 14 of the multiplicity of flutes 11 lie at a circumference of reflector 1 from which a line drawn to the remotest increment of aperture 10 makes an angle X of about 22° with the plane of aperture 10. In the specific embodiment shown, the aperture 10 has a diameter of 14½ inches, and the upper extremities 14 of the flutes 11 lie at a circumference which is at approximately 4¾ inches above the plane of aperture 10. As will be observed by reference to FIGURE 2, the lengthwise axis of no flute 11 runs, in all senses, perpendicular to the plane of aperture 10, but such axes, as well as the crestlines of ridges 12 and of valleys 13, do each lie in a plane which is perpendicular to the plane of aperture 10; and no more than two (e.g., diametrically opposite ones) of such axes or ridges or valleys lie in the same such plane. While, in the form shown, the lower extremity of the fluting 11 is slightly spaced from the aperture 10, and the intervening portion 15 of the reflector is flared outwardly for stabilizing and aesthetic purposes, such is optional, and the fluting may, if desired, extend completely to the aperture when it is not objectionable that the aperture present a serpentine appearance. In the embodiment shown, the fluting is such that the valleys 13 are upset outwardly for a distance of about an eighth of an inch, which is to say, that at any circular section parallel to aperture 10, the exterior of the valleys 13 lie at a radius about one eighth inch greater than the radius of the exterior of ridges 12. The finite value of such differential in radius, however, is not critical, and may vary anywhere from one sixty-fourth to one-fourth of an inch, depending upon practical considerations. Similarly, in the embodiment shown, the outside ridge-to-ridge spacing between successive flutes is about nine sixteenths of an inch adjacent the upper extremities 14, and about five eighths of an inch adjacent flare 15, such variation being due to the progressively diminishing perimeter of the reflector from the aperture 10 toward the light source 6. Thus, the several ridges 12, while not truly parallel with each other, are substantially so, and to the casual observer, give the appearance of being parallel. Again, such spacing is not critical, and may be as great as one inch provided care is taken in the upsetting operation to avoid the production, on the inside of the fluted belt, of contiguous planar areas of such magnitude as to be readily discernible macroscopically, at normal viewing angles from normal viewing distances, when the luminaire is in operation.

In the embodiment shown, the reflector 1 is formed of etch grade (No. 31) sheet aluminum, and the fluting is formed concurrently with the formation of the balance of the reflector from a flat sheet in a "Hydroform" press. In such method of formation, it is desirable that the longitudinal axes of the flutes 11 lie each in a plane which is perpendicular to aperture 10, but where other methods of formation of the reflector are utilized, considerable deviation from such orientation is permissible without adversely affecting the result.

As pointed out hereinbefore, it is preferred that the surface of the fluted belt be as specular as practical, and the greater the specularity of that belt, the greater the diminution of objectionable glare emanating therefrom. For practical purposes, adequate specularity may be achieved by treating the formed reflector as indicated hereinbefore for Insert No. 3 in Table I.

As illustrating the objectionable-glare reducing effect of the fluting hereinbefore described, comparative tests were made between the reflector of FIGURES 1–3 and another reflector identical therewith in all respects save that it was unfluted. In the following table, the unfluted reflector is designated "plain," while the reflector of FIGURES 1, 2 and 3 is designated "fluted." The results of such comparative tests are here tabulated:

| Viewing angle, degrees (below horizontal) | Target area | Foot-lamberts | |
|---|---|---|---|
| | | Fluted | Plain |
| 30 | A | 1,200 | 4,700 |
| | B | 730 | 1,750 |
| | C | 540 | 1,350 |
| 25 | A | 720 | 2,350 |
| | B | 420 | 1,000 |
| | C | 340 | 850 |
| 20 | A | 430 | 1,200 |
| | B | 280 | 600 |
| | C | 205 | 475 |
| 15 | A | | |
| | B | 190 | 340 |
| | C | 130 | 305 |
| 10 | A | | |
| | B | | |
| | C | 100 | 190 |

The locations of the target areas A, B and C are indicated by those letters on FIGURE 2. The blanks at the 15° line A and at the 10° lines A and B indicate that no reading was obtainable on those target areas because the brightness was too low to read on the meter. The viewing distance was the same in all cases, and in each case, the reflector was illuminated with a 400 watt mercury vapor lamp having a clear envelope at 110 volts.

The fluting need not be of the serpentine configuration shown in FIGURE 3, but may, if desired, be of the sawtooth configuration shown in FIGURE 4 provided care be taken that there be a minimum of contiguous area in the fluted belt which occupies the same position relative to the source of light which it would have occupied had the reflector not been so fluted. This dictates that the peaks 113, whether on the inside or the outside of the reflector, have as near zero radius of bending as practical.

In the embodiment shown in FIGURE 5, the fluting of the invention is applied to a dome-shaped reflector of a more or less conventional type employed in situations where the aperture is to be covered by a lens. The top portion 16 is conoidal and arranged to accommodate a light source which usually extends horizontally, but may extend vertically as shown in FIGURE 2, if desired. Below the top section 16, there is a truncated pyramidal section defined by four walls 17 whose lower extremities define a substantially square aperture 18, and flanges 19 extend outwardly from the aperture 18 to accommodate attachment of the desired lens. Glare spots commonly appear in the lens of such reflectors, and such glare spots may be substantially eliminated by application of the fluting of the invention to the otherwise substantially flat pyramidal walls 17, particularly to the portions thereof which are substantially distant from the corners. Such fluting is shown in FIGURE 5 at 20, 21, 22 and 23. In this instance, the fluting is shown as being upset inwardly from the sheet metal body of the pyramidal walls, but such is not critical. Indeed, in both embodiments, the fluting may be upset inwardly or outwardly, depending upon manufacturing convenience; and the fluting may be of the configuration shown in either FIGURE 3 or FIGURE 4.

As indicated by the contrast between the values tabulated on the same line under "Fluted" and "Plain" in the table in column 5, the fluting markedly reduces brightness of glare in the critical directions. It does so by reflecting incident light downwardly and sidewise within the desired cone of light, and by minimizing the contiguous area from which the image of any part of the light source is reflected at objectionable glare producing angles.

From the foregoing description, those skilled in the art should readily understand the construction and operation of the invention and realize that it accomplishes its object. While two specific embodiments of the invention have been disclosed and variations thereof suggested, it is not to be understood that the invention is limited to the details disclosed save as indicated in the following claims.

Having thus described the invention, what is claimed and desired to be secured by Letters Patent is:

1. In the art of controlling glare from a reflector surrounding a high intensity light source, said reflector having a downwardly addressed substantially horizontal planar aperture vertically remote from said light source, and a coniform light reflecting surface extending in progressively diminishing perimeter from said aperture toward and about said light source, the improvement which comprises, providing a series of flutes adjacent said aperture while leaving a substantial part of said reflecting surface unfluted, the valleys of the individual flutes lying respectively in planes which include the center of said light source and which are substantially perpendicular to the plane of said aperture, no more than two such valleys lying in the same such plane, and said flutes being substantially specular.

2. The improvement of claim 1 wherein the individual valleys are substantially uniformly spaced each from its neighbor.

3. The improvement of claim 1 wherein the flutes are an integral part of the reflector.

4. The improvement of claim 1 wherein the respective flutes are equi-sized, merge into each other perimetrically of said light reflecting surface, and extend toward said light source to a level from which a straight line to the remotest increment of the reflector's aperture makes an angle of at least about 20° with the plane of said aperture.

5. The improvement of claim 1 wherein the reflecting surface is a substantially conic section of revolution.

6. The improvement of claim 1 wherein the reflective surface is a truncated pyramid.

7. A dome-shaped reflector having a substantially circular aperture at its base and means accommodating a light source near its zenith, and a perimetrically continuous belt of successive flutes on the interior of said reflector adjacent said aperture, said flutes each having elongated valleys and rounded ridges extending substantially in the base to zenith direction, said rounded ridges having convex surfaces addressed inwardly of the reflector, and a substantial part of the light reflecting surfaces of said reflector being unfluted.

8. A substantially pyramidal reflector having a substantially polygonal aperture at its base defined by sides which are generally flat, the central portions of said sides having a series of flutes on the interior thereof adjacent said aperture, said flutes each having elongated valleys and rounded ridges extending substantially in the base to zenith direction, said rounded ridges having convex surfaces addressed inwardly of the reflector, and a substantial part of the light reflecting surface of said reflector being unfluted.

References Cited
UNITED STATES PATENTS

| Re. 3,826 | 2/1870 | Frink | 240—103 |
| 58,212 | 9/1866 | Butler | 240—103 |
| 982,823 | 1/1911 | Jennings | 240—103 |
| 3,040,994 | 6/1962 | Anderson et al. | 240—103 |

FOREIGN PATENTS

| 282,869 | 2/1931 | Italy. |
| 1,037,457 | 7/1966 | Great Britain. |

NORTON ANSHER, *Primary Examiner.*

R. M. SHEER, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,401,258            September 10, 1968

Frederick E. Guth

It is certified that error appears in the above identified patent and that said Letters Patent are hereby corrected as shown below:

Column 2, lines 1 and 2, cancel "metal reflector which is intended for use in open-aperture familiar type of dome-shaped rounded-aperture sheet" and insert -- familiar type of dome-shaped rounded-aperture sheet metal reflector which is intended for use in open-aperture --; line 31, after "reduction" insert -- of --. Column 6, line 44, "surfaces" should read -- surface --.

Signed and sealed this 3rd day of February 1970.

(SEAL)
Attest:

Edward M. Fletcher, Jr.            WILLIAM E. SCHUYLER, JR.
Attesting Officer                          Commissioner of Patents